United States Patent
Mimura et al.

(10) Patent No.: US 10,486,531 B2
(45) Date of Patent: Nov. 26, 2019

(54) VEHICLE DISPLAY SYSTEM

(71) Applicant: HONDA MOTOR CO., LTD., Minato-ku, Tokyo (JP)

(72) Inventors: Yoshitaka Mimura, Utsunomiya (JP); Yuji Yokota, Utsunomiya (JP); Kyoko Wasai, Sakura (JP); Jiro Asada, Utsunomiya (JP); Daisuke Miyajima, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/843,064

(22) Filed: Dec. 15, 2017

(65) Prior Publication Data
US 2018/0178649 A1   Jun. 28, 2018

(30) Foreign Application Priority Data
Dec. 26, 2016   (JP) .................. 2016-251672

(51) Int. Cl.
*G06F 3/044* (2006.01)
*B60K 35/00* (2006.01)

(52) U.S. Cl.
CPC .............. *B60K 35/00* (2013.01); *G06F 3/044* (2013.01); *B60K 2370/1446* (2019.05); *B60K 2370/154* (2019.05); *B60K 2370/52* (2019.05)

(58) Field of Classification Search
CPC ............ B60W 50/10; B60W 30/18163; G05D 1/0088; G06F 3/0488; G06F 3/04842; G06F 3/044
See application file for complete search history.

(56) References Cited

U.S. PATENT DOCUMENTS

| | | | |
|---|---|---|---|
| 6,373,472 B1 * | 4/2002 | Palalau | B60K 37/02 345/156 |
| 7,084,859 B1 * | 8/2006 | Pryor | G01C 21/3664 345/156 |
| 7,397,463 B1 * | 7/2008 | Kishi | G09B 29/106 340/461 |
| 7,616,104 B2 * | 11/2009 | Hara | B60K 35/00 340/438 |

(Continued)

FOREIGN PATENT DOCUMENTS

| | | |
|---|---|---|
| JP | 2006-298241 | 11/2006 |
| JP | 2007-106353 | 4/2007 |
| WO | 2013/179390 | 12/2013 |

OTHER PUBLICATIONS

Japanese Office Action for Japanese Patent Application No. 2016-251672 dated Sep. 11, 2018.

*Primary Examiner* — Bryan Earles
(74) *Attorney, Agent, or Firm* — Amin, Turocy & Watson LLP

(57) ABSTRACT

A vehicle display system includes: an operation switch configured to be provided in a vehicle and to distinguish and detect a touch and an operation of an operator; a display device configured to be provided at a position at which the operator can visually recognize the display device; and a control device configured to display, on the display device, information regarding a function to be executed when an operation with respect to the operation switch is detected when the touch of the operation switch is detected.

6 Claims, 10 Drawing Sheets

(56) References Cited

U.S. PATENT DOCUMENTS

| | | | |
|---|---|---|---|
| 2009/0164062 A1* | 6/2009 | Aoki | B60Q 1/0082 701/36 |
| 2009/0189373 A1* | 7/2009 | Schramm | B60K 35/00 280/731 |
| 2010/0208074 A1* | 8/2010 | Hattori | B60Q 1/50 348/148 |
| 2017/0286785 A1* | 10/2017 | Schaffer | B60K 35/00 |

* cited by examiner

WHEN RES SWITCH HAS NOT BEEN TOUCHED
(WHEN MAIN SWITCH IS IN OFF-STATE)

WHEN RES SWITCH HAS BEEN TOUCHED
(WHEN MAIN SWITCH IS IN OFF-STATE)

WHEN MAIN SWITCH HAS BEEN PRESSED (OFF → ON)

WHEN RES SWITCH HAS NOT BEEN TOUCHED
(WHEN VEHICLE STOPS)

WHEN RES SWITCH HAS BEEN TOUCHED
(WHEN VEHICLE STOPS)

WHEN MENU SWITCH HAS BEEN PRESSED

VEHICLE DISPLAY SYSTEM

CROSS-REFERENCE TO RELATED APPLICATION

Priority is claimed on Japanese Patent Application No. 2016-251672, filed Dec. 26, 2016, the content of which is incorporated herein by reference.

BACKGROUND OF THE INVENTION

Field of the Invention

The present invention relates to a vehicle display system.

Description of Related Art

In the related art, a display system which includes operation switches provided on a steering wheel of a vehicle and a display device which displays, on a windshield, different images in accordance with touch and operations of an operator with respect to the operation switches is known (for example, refer to Japanese Unexamined Patent Application, First Publication No. 2007-106353). Each of the operation switches of the display system has a touch sensor, and outputs a sensor signal derived from touch of the operator and an operation signal derived from an operation of the operator by distinguishing from each other. When an operator touches an operation switch, the display device highlights a switch image corresponding to the operation switch, and when an operator operates an operation switch, the display device displays an operation responsive image to indicate an operation state.

SUMMARY OF THE INVENTION

However, according to the display system of the related art, the switch image is merely for visual identification of the operation switch that an operator has touched, and the operation responsive image is merely for visual recognition of an operation result of a predetermined function resulting from the switch operation of an operator.

Thus, in order to gain an appropriate operation result intended by a desired function though a switch operation, it is necessary for an operator to accurately ascertain the operation result of the function associated with the switch operation beforehand and to precisely execute the switch operation. However, for an operator inexperienced at switch operations or the like, there is concern that, for example, it may be difficult to accurately ascertain an operation result intended by a function associated with a switch operation beforehand and to precisely execute the switch operation, which may cause a problem of degradation in using the operation switch.

Aspects of the present invention have been conceived taking the above-described circumstances into consideration, and the invention aims to provide a vehicle display system which can accurately obtain an operation result intended by a desired function through a switch operation of an operator.

The present invention has employed the following aspects in order to solve the above-described problem and to accomplish objectives.

(1) A vehicle display system according to an aspect of the present invention includes, an operation switch configured to be provided in a vehicle and to distinguish and detect a touch and an operation of an operator; a display device configured to be provided at a position at which the operator can visually recognize the display device; and a control device configured to display, on the display device, information regarding a function to be executed when an operation with respect to the operation switch is detected when the touch of the operation switch is detected.

(2) According to the aspect of (1), the operation may be a pressing operation with respect to the operation switch.

(3) According to the aspect of (1) or (2), when the touch of the operation switch is detected, the control device may display, on the display device, the information regarding the function to be executed when the operation with respect to the operation switch is detected as well as information regarding a current state of the function.

(4) According to any one aspect from (1) to (3), when a touch of the operation switch is detected in a state in which an execution of the function is not permitted, the control device may display information regarding an operation necessary for permitting the execution of the function on the display device.

(5) According to any one aspect from (1) to (4), when the information regarding the function is setting information of the function and a touch of the operation switch for operating the setting information is detected in a state in which the setting information is not displayed on the display device, the control device may display the setting information on the display device.

(6) According to any one aspect from (1) to (5), when a touch or an operation with respect to the operation switch is detected in a state in which an execution of the function is not permitted, the control device may display information regarding a use method of the operation switch on the display device.

(7) According to the aspect of (6), when the touch or the operation with respect to the operation switch is detected in the state in which the execution of the function is not permitted, the control device may display information regarding an operation necessary for accessing detailed information of the information regarding the use method of the operation switch on the display device.

According to the vehicle display system of the aspect described in (1), the information regarding the function associated with the operation of the operation switch is displayed on the display device when the operator touches the operation switch, and thus the function to be executed through the operation can be accurately ascertained before the operation of the operation switch. Accordingly, even when the operator is inexperienced at the switch operation, for example, he or she can perform the switch operation with a sense of security after confirming the function associated with the operation of the operation switch, and thus usability of the operation switch can be improved.

In the case of (2), usability of the operation switch can be improved since contact and a pressing operation by the operator with respect to the operation switch are distinguished when display of information is performed.

In the case of (3), since the information regarding a function associated with an operation of the operation switch as well as the information regarding a current state of the function is displayed on the display device when the operator touches the operation switch, a change in the state resulting from the execution of the function can be clearly ascertained. Accordingly, usability of the operation switch can be further improved.

In the case of (4), since the information regarding the operation necessary for permitting the execution of the function associated with the operation of the operation switch is displayed on the display device when the operator touches the operation switch, proficiency in properly operating the operation switch can be improved.

In the case of (5), since the setting information of the function associated with the operation of the operation switch is displayed on the display device when the operator touches the operation switch, usability of the operation switch can be improved without requiring a special operation or a cumbersome operation for displaying the setting information.

In the case of (6), since the information regarding the use method of the operation switch is displayed on the display device when the operator touches the operation switch, proficiency in properly operating the operation switch can be improved and usability of the operation switch can also be improved.

In the case of (7), since the information regarding the operation necessary for accessing detailed information of the information regarding the use method of the operation switch is displayed on the display device when the operator touches the operation switch, details of the use method of the operation switch can be easily ascertained.

DETAILED DESCRIPTION OF THE INVENTION

A vehicle display system according to embodiments of the present invention will be described below with reference to the accompanying drawings.

Figure 1:
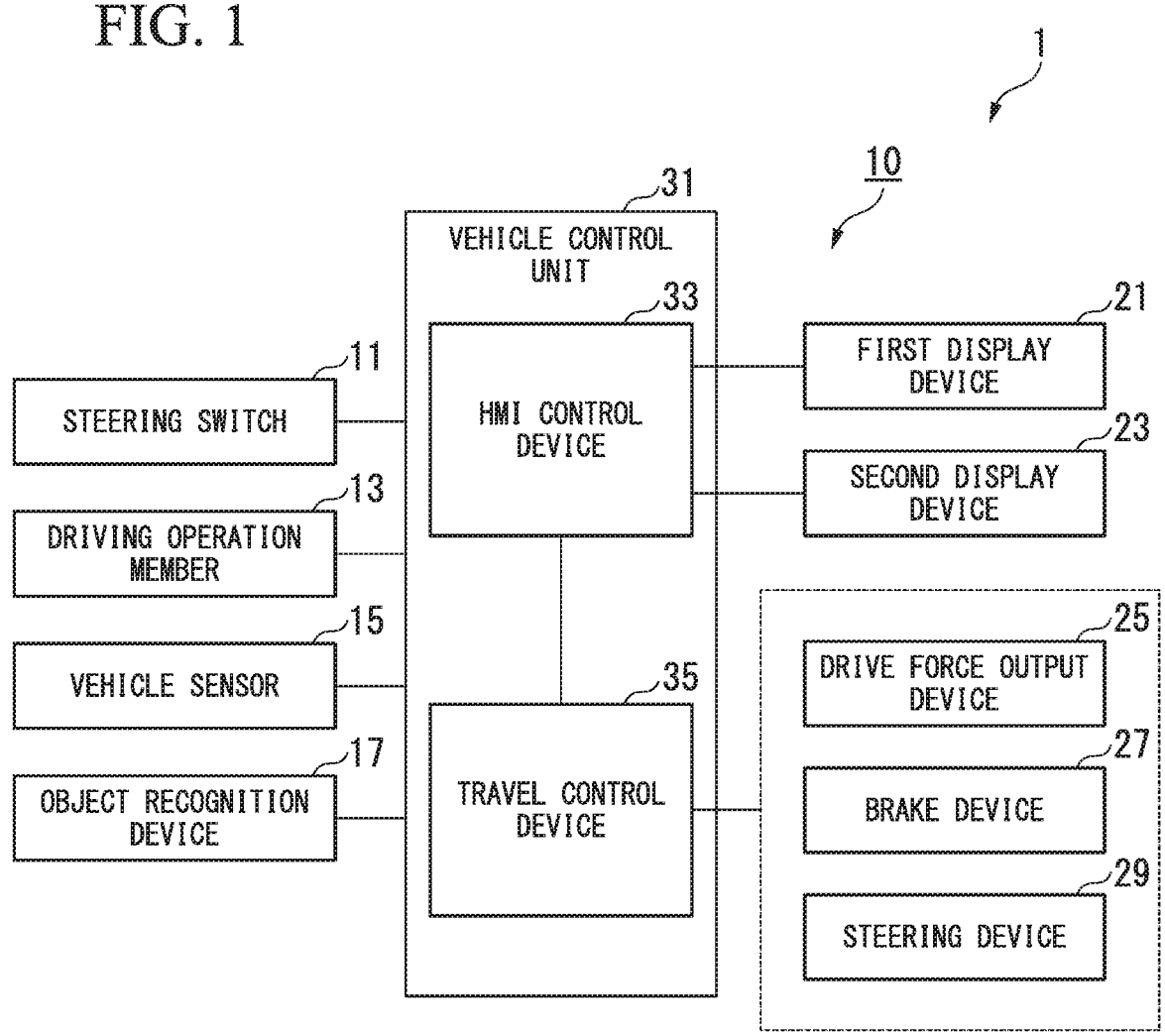
FIG. 1 is a block diagram of a functional configuration of a vehicle display system according to an embodiment of the present invention.

A vehicle display system 10 according to the present embodiment is mounted in a vehicle 1. The vehicle 1 has a steering switch 11, a driving operation member 13, a vehicle sensor 15, an object recognition device 17, a first display device 21, a second display device 23, a drive force output device 25, a brake device 27, a steering device 29, and a vehicle control unit 31, for example, as shown in FIG. 1. The vehicle control unit 31 includes, for example, a human-machine interface (HMI) control device 33 and a travel control device 35.

The vehicle display system 10 according to the embodiment is constituted by, for example, the steering switch 11, the first display device 21, the second display device 23, and the HMI control device 33.

Figure 2:
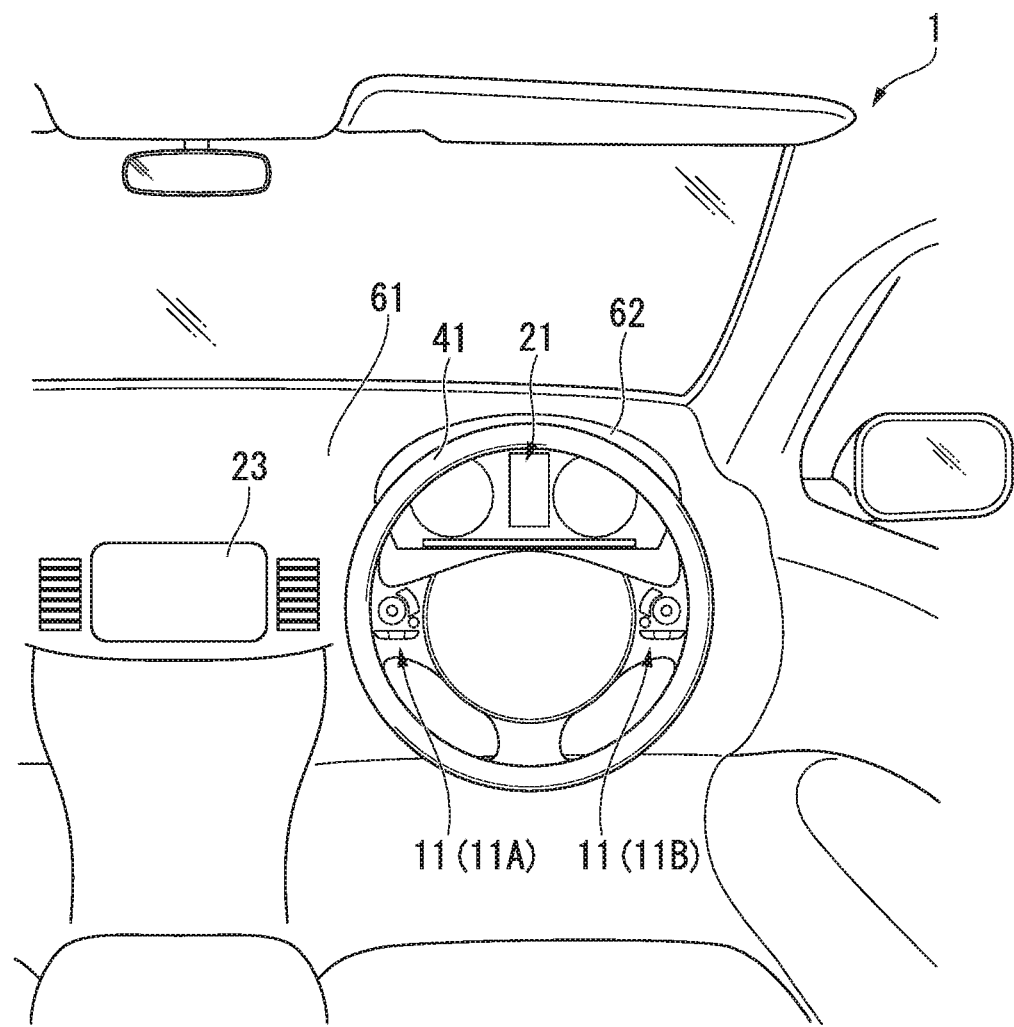
FIG. 2 is a diagram showing steering switches provided on a steering wheel and a first display device and a second display device provided on an instrument panel of the vehicle display system according to the embodiment of the present invention.

The steering switch 11 is disposed on a steering wheel 41 as illustrated in FIG. 2. The steering switch 11 is an input device disposed at a position at which a driver holding the steering wheel 41 to drive the vehicle 1 can operate the switch with his or her fingers. The steering switch 11 distinguishes and detects touch and operations of an operator. The steering switch 11 has a structure in which, for example, mechanical switches which receive operations performed with fingers of an operator and a capacitance sensor which detects touch of fingers of an operator are provided in a superimposing manner.

The mechanical switch is a switch including, for example, a directional key which is obliquely operated and a push button which is pressed to be operated with an operator's finger, and the like. The steering switch 11 detects the touch of the operator's finger and outputs a detection signal in accordance with the touch, and receives a pressing operation performed with the operator's finger and outputs a detection signal in accordance with the pressing operation.

Figure 3:
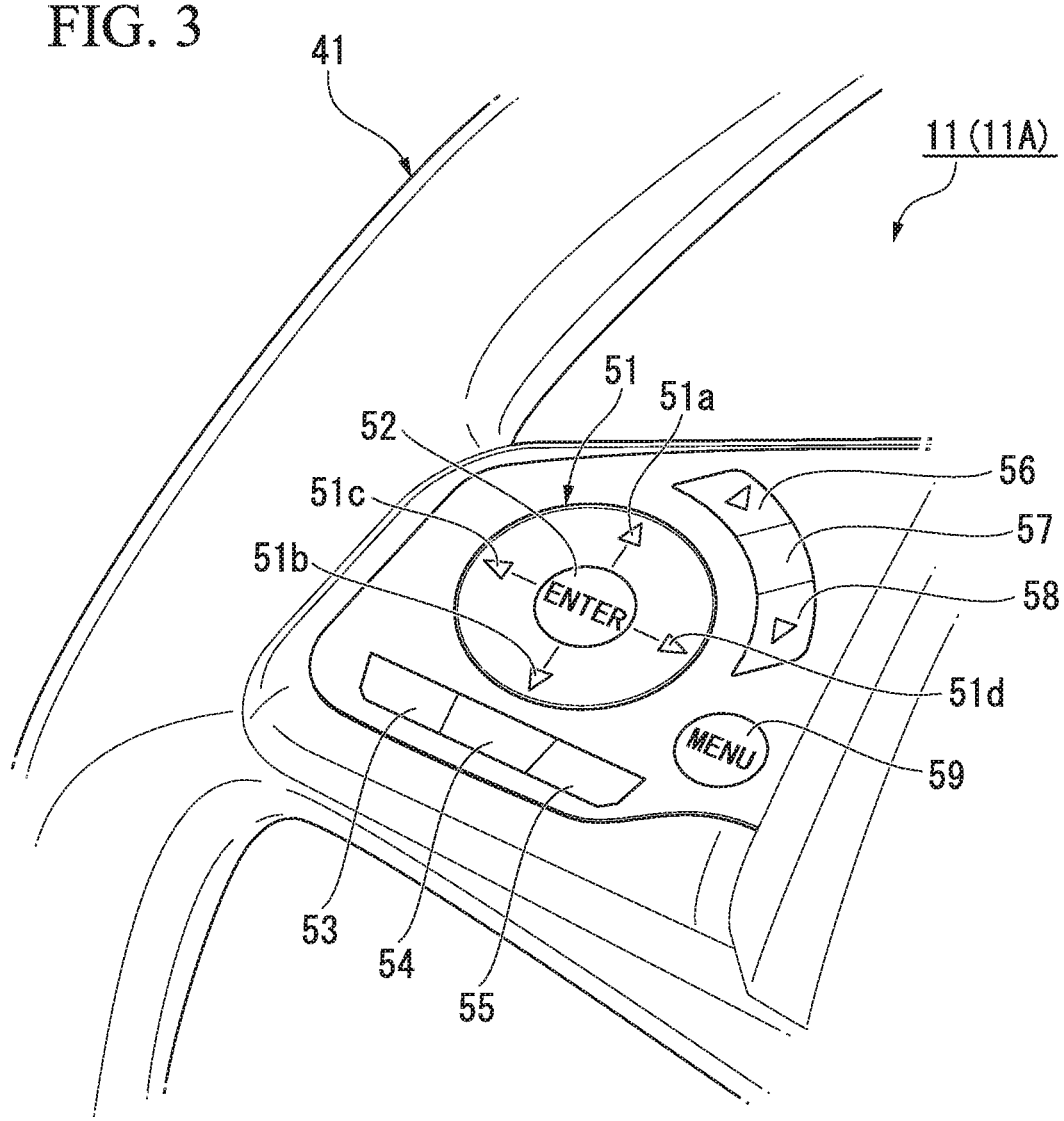
FIG. 3 is a perspective diagram showing an enlarged first steering switch of the vehicle display system according to the embodiment of the present invention.
Figure 4:
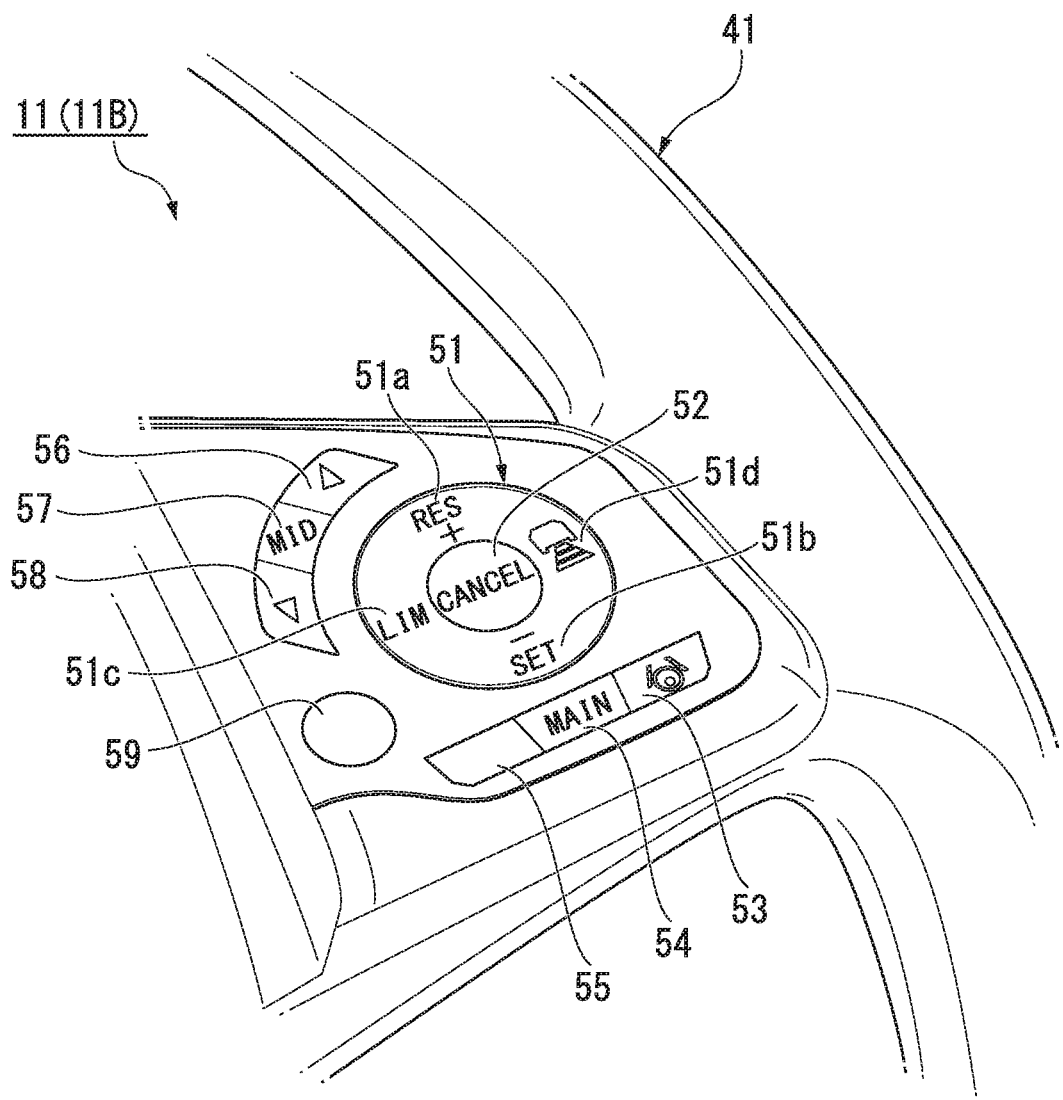
FIG. 4 is a perspective diagram showing an enlarged second steering switch of the vehicle display system according to the embodiment of the present invention.

The vehicle 1 has two steering switches 11 (a first steering switch 11A and a second steering switch 11B), for example, that are operated using each of left and right fingers of a driver. Each of the first steering switch 11A and the second steering switch 11B has a plurality of operation portions, for example, as illustrated in FIG. 3 and FIG. 4. The plurality of operation portions include, for example, a directional key 51 and eight push buttons. The directional key 51 includes a first key 51a, a second key 51b, a third key 51c, and a fourth key 51d. The eight push buttons are a first push button 52, a second push button 53, a third push button 54, a fourth push button 55, a fifth push button 56, a sixth push button 57, a seventh push button 58, and an eighth push button 59. The first push button 52 is disposed at a center portion of the directional keys 51. The first to eighth push buttons 52 to 59 are disposed in peripheries of the directional keys 51. Each of the first to fourth keys 51a to 51d of the directional key 51 and the first to eighth push buttons 52 to 59 detects the touch of the operator's finger and outputs a detection signal in accordance with the touch, and receives an oblique operation or a pressing operation performed with the operator's finger and outputs an operation signal in accordance with the operation.

The first steering switch 11A receives operations relating to, for example, video and audio equipment, a navigation device, and a camera mounted in the vehicle 1, an information terminal carried by a passenger of the vehicle 1, and the like.

The first key 51a and the second key 51b of the directional key 51 included in the first steering switch 11A receive, for example, operations relating to turning the volume of the video and audio equipment up and down.

The third key 51c and the fourth key 51d of the directional key 51 receive, for example, operations relating to switching of broadcasting channels viewed and listened to using the video and audio equipment or data reproduced by the video and audio equipment. The first push button (an ENTER switch) 52 receives, for example, operations relating to switching of reproduction sources reproduced by the video and audio equipment. The second to fourth push buttons 53, 54, and 55 receive, for example, operations relating to switching of speaking in a hands-free call using the information terminal, an off-hook operation, an on-hook operation, and the like. The fifth to seventh push buttons 56, 57, and 58 receive, for example, operations relating to call-out and switching of menu items that are selectable on a screen being displayed on the first display device 21 or the second display device 23. The ninth push button (a MENU switch) 59 receives, for example, operations relating to switching modes of a screen displayed on the first display device 21 or the second display device 23 according to a device to be operated.

The second steering switch 11B receives, for example, operations relating to travel support operations such as cruise control, lane keeping assistance, and the like of the vehicle 1 controlled by the travel control device 35.

The first key (a RES switch) 51a and the second key (a SET switch) 51 of the directional key 51 included in the second steering switch 11B receive, for example, operations relating to adjustment of a speed to a set speed and return to a normal speed in cruise control. The third key (an LIM switch) 51c of the directional key 51 receives, for example, operations relating to switching between setting and cancellation of an upper limit speed in cruise control. The fourth key 51d of the directional key 51 receives, for example, operations relating to switching of settings of an inter-vehicle distance with a preceding vehicle in cruise control. The first push button (a CANCEL switch) 52 receives, for example, operations relating to cancellation of execution of cruise control. The second push button 53 receives, for example, operations relating to switching between execution and cancellation of lane keeping assistance. The third push button (a MAIN switch) 54 receives, for example, operations relating to turning on and off of travel support operations including cruise control, lane keeping assistance, and the like.

The fifth to seventh push buttons 56, 57, and 58 receive, for example, operations relating to call-out and switching of screens that can be displayed on the first display device 21.

The driving operation member 13 includes operation members, for example, an accelerator pedal, a brake pedal, a shift lever, the steering wheel 41, and the like. The driving operation member 13 has, for example, sensors for detecting operation quantities of the operation members and presence or absence of operations. Each of the sensors outputs a signal of a detection result to at least any of the travel control device 35, the drive force output device 25, the brake device 27, and the steering device 29.

The vehicle sensor 15 includes, for example, a speed sensor for detecting a speed of the vehicle, an acceleration sensor for detecting acceleration of the vehicle 1, a yaw rate sensor for detecting an angular velocity around a vertical axis of the vehicle 1, and the like. Each of the sensors outputs a signal of a detection result to the vehicle control unit 31.

The object recognition device 17 includes, for example, a camera, a radar device, a finder, and the like.

The camera is, for example, a digital camera having a solid-state image sensor such as a charge coupled device (CCD) or a complementary metal oxide semiconductor (CMOS). The camera captures images of peripheries the vehicle 1, for example, the front, the rear, the sides, and the like thereof and outputs data of the captured images.

The radar device radiates electromagnetic waves to peripheries of the vehicle 1, receives electromagnetic waves (reflection waves) reflected from an object, and thereby detects at least a position (a distance and an orientation) of the object and outputs information of the detection result.

The finder radiates light (irradiation light) to peripheries of the vehicle 1, receives light scattered by an object, and thereby detects a distance to the object and outputs information of the detection result. The finder uses, for example, light detection and ranging or laser imaging detection and ranging (LIDAR).

The object recognition device 17 recognizes a position, a speed, an acceleration, a type, and the like of an object in a periphery of the vehicle 1 based on information output from at least one of the camera, the radar device, the finder, and the like. The object recognition device 17 outputs information of the recognition result to the vehicle control unit 31.

The first display device 21 and the second display device 23 are disposed at positions at which a driver of the vehicle 1 can visually recognize the devices.

Figure 5:
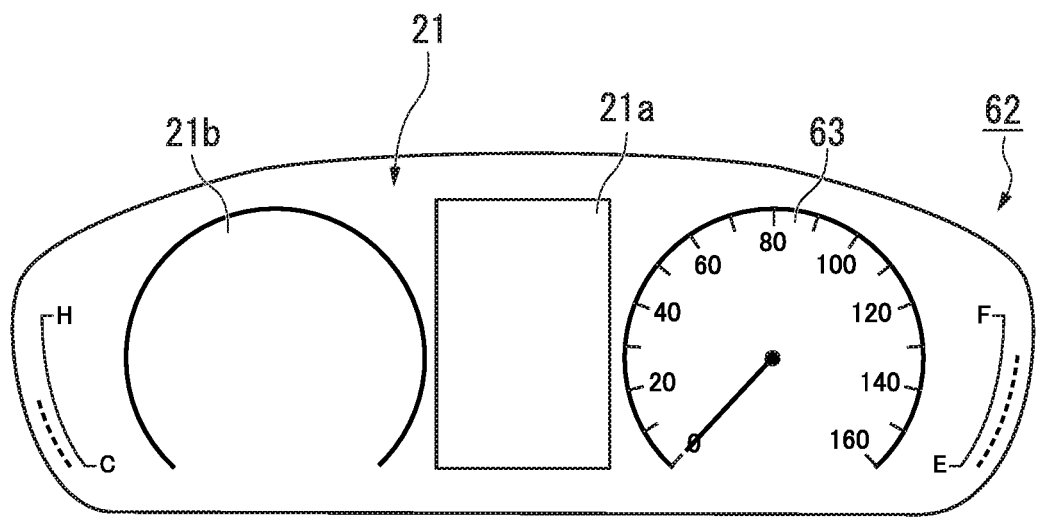
FIG. 5 is a diagram showing the first display device disposed in a meter panel portion of the vehicle display system according to the embodiment of the present invention.

The first display device 21 is disposed on, for example, a meter panel portion 62 provided on the instrument panel 61 in front of the driver's seat as illustrated in FIG. 2. The first display device 21 is a multi-information display configured by, for example, a liquid crystal display or an organic EL display. The first display device 21 includes, for example, a first display unit 21a and a second display unit 21b that are disposed close to a gauge 63 such as a speed meter on the meter panel portion 62 as illustrated in FIG. 5. A size of a display area of the second display unit 21b is formed to be, for example, larger than a size of a display area of the first display unit 21a. The first display unit 21a displays, for example, simpler information than the second display unit 21b, and the second display unit 21b displays, for example, more detailed information than the first display unit 21a.

A display operation of the first display device 21 is controlled by the HMI control device 33 in accordance with, for example, an operation of an operator or the like that the first steering switch 11A or the second steering switch 11B receives.

The second display device 23 is disposed at a center portion of the instrument panel 61, for example, as illustrated in FIG. 2. The second display device 23 is a touch panel configured by, for example, a liquid crystal display or an organic EL display such as a display-audio device.

A display operation of the second display device 23 is controlled by the HMI control device 33 in accordance with, for example, an operation of an operator that the first steering switch 11A, the second steering switch 11B, or the touch panel of the second display device 23 receives.

The drive force output device 25 outputs a travel drive force (torque) required for the vehicle 1 to travel to drive wheels. The drive force output device 25 includes, for example, a combination of an internal combustion engine, an electric motor, and a transmission and an electronic control unit (ECU) which controls the above-described components. The ECU controls a travel drive force in accordance with information input from the travel control device 35 or information input from the driving operation member 13.

The brake device 27 includes, for example, a brake caliper, a cylinder which transmits oil pressure to the brake caliper, an electric motor which causes the cylinder to generate oil pressure, and a brake ECU. The brake ECU controls the electric motor in accordance with information input from the travel control device 35 or information input from the driving operation member 13 and outputs braking torque caused by a braking operation to each wheel. The brake device 27 includes, for example, a mechanism which transmits not only oil pressure generated by the electric motor but also oil pressure generated due to an operation with respect to the brake pedal of the driving operation member 13 to the cylinder via a master cylinder. Note that a configuration of the brake device 27 is not limited to the above-described configuration, and the brake device may control an actuator in accordance with information input from the travel control device 35 and transmit oil pressure of the master cylinder to the cylinder.

The steering device 29 includes, for example, a steering ECU and an electric motor.

The electric motor changes a direction of a steering wheel by, for example, imposing a force on a rack-and-pinion mechanism. The steering ECU drives the electric motor in accordance with information input from the travel control device 35 or information input from the driving operation member 13 to change a direction of the steering wheel.

Each of the HMI control device 33 and the travel control device 35 of the vehicle control unit 31 is a software function unit which functions when a predetermined program is executed by a processor, for example, a central processing unit (CPU), or the like. The software function unit is an ECU having a processor such as a CPU, a read only memory (ROM) which stores program, a random access memory (RAM) which temporarily stores data, and an electronic circuit such as a timer. Note that at least part of the vehicle control unit 31 may be an integrated circuit using large scale integration (LSI).

The HMI control device 33 controls various kinds of equipment mounted in the vehicle 1 and information terminals and the like carried by passengers of the vehicle 1 in accordance with detection signals or operation signals output from steering switch 11. The various kinds of equipment mounted in the vehicle 1 include the video and audio equipment, a car navigation device, the camera, the first display device 21, the second display device 23, and the like.

The travel control device 35 controls the drive force output device 25, the brake device 27, and the steering device 29 in accordance with operation signals output from the steering switch 11, and signals output from the driving operation member 13, the vehicle sensor 15, and the object recognition device 17. The travel control device 35 controls, for example, travel support operations such as cruise control and lane keeping assistance of the vehicle 1. Cruise control is, for example, control of constant speed travel in which a speed of the vehicle 1 is maintained constant, following travel in which an inter-vehicle distance between the vehicle 1 and a preceding vehicle is maintained constant, and the like. Lane keeping assistance is control in which the vehicle 1 is supported or advised in traveling at the center of a lane.

The vehicle display system 10 according to the present embodiment is configured as described above. Next, an operation of the vehicle display system 10, for example, control of the first display device 21 by the HMI control device 33 in accordance with touch or an operation of an operator performed on the steering switch 11, will be described with reference to FIG. 6 to FIG. 8.

When a detection signal in accordance with touch of an operator is output from the steering switch 11 and an operation signal in accordance with an operation of an operator is output from the steering switch 11, the HMI control device 33 performs different types of control over the first display device 21. When a detection signal is output from the steering switch 11, the HMI control device 33 displays, on the first display device 21, information regarding a function to be executed when an operation signal is output from the steering switch 11. When an operation signal is output from the steering switch 11, the HMI control device 33 executes display of information regarding execution of a function associated with the operation of the steering switch 11.

Figure 6:
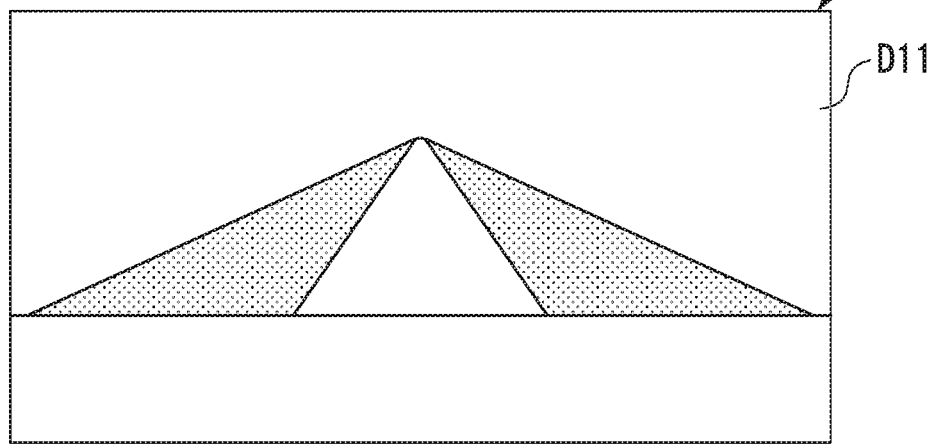
FIG. 6 is a diagram showing examples of display screens of the first display device transitioning in accordance with touch and an operation of an operator with respect to the steering switches of the vehicle display system according to the embodiment of the present invention.
Figure 6:
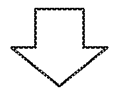
Figure 6:
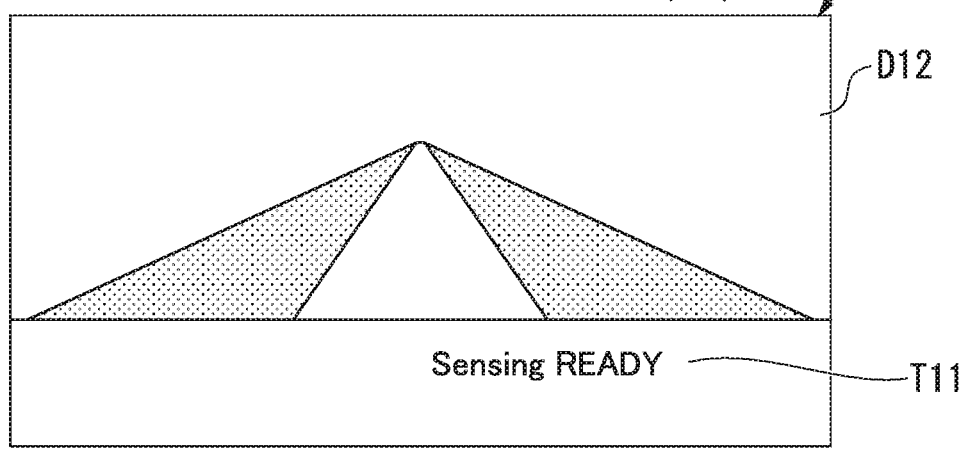
Figure 6:
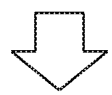
Figure 6:
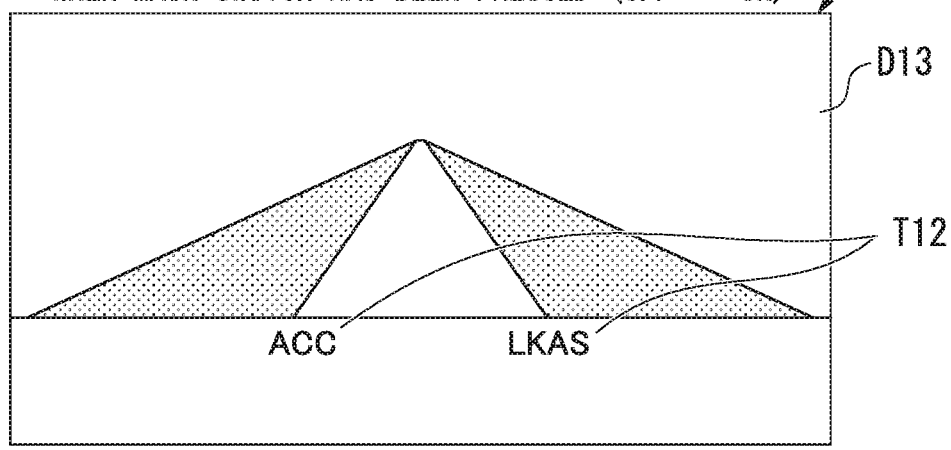

When the third push button (the MAIN switch) 54 of the second steering switch 11B is touched and operated by an operator in an off state of the travel support operation, for example, the HMI control device 33 changes information to be displayed on the first display device 21 as illustrated in FIG. 6.

First, the HMI control device 33 displays a first screen D11, which is an initial screen, on the first display device 21 when, for example, the travel support operation is in the off state due to the third push button (the MAIN switch) 54 being in an off state and the operator has not touched the third push button (the MAIN switch) 54.

Next, when a detection signal is output from the third push button (the MAIN switch) 54 in response to the operator touching the third push button (the MAIN switch) 54, the HMI control device 33 displays a second screen D12 on the first display device 21. The second screen D12 shows information regarding switching of on and off states of the travel support operation which is a function executed when, for example, an operator touches the third push button (the MAIN switch) 54. The second screen D12 indicates that, for example, the travel support operation can be switched from the off state to the on-state and includes first text data T11 as information indicating whether a current state of the travel support operation is the on-state or the off state. The first text data T11 is data of, for example, phrases indicating that preparation for various types of sensing necessary for the travel support operation is completed (e.g., "sensing ready").

Next, when an operation signal is output from the third push button (the MAIN switch) 54 in response to the operator operating the third push button (the MAIN switch) 54, the HMI control device 33 displays a third screen D13 on the first display device 21. The third screen D13 shows information regarding execution of a function associated with the third push button (the MAIN switch) 54, i.e., information regarding switching between the on and off states of the travel support operation. The third screen D13 includes second text data T12 as information indicating that, for example, the travel support operation is in the on-state. The second text data T12 is text data indicating, for example, that cruise control and lane keeping assistance of the travel support operation are in the on-state (e.g., adaptive cruise control system (ACC) and lane keeping assistance system (LKAS)). On the other hand, when the output of the detection signal from the third push button (the MAIN switch) 54 stops in response to the operator releasing their finger of the third push button (the MAIN switch) 54, the HMI control device 33 displays the first screen D11 on the first display device 21.

When a detection signal is output from the steering switch 11 in a state in which execution of a function associated with an operation of the steering switch 11 is not permitted, the HMI control device 33 displays information regarding an operation necessary for permitting the execution of the function on the first display device 21.

Figure 7:
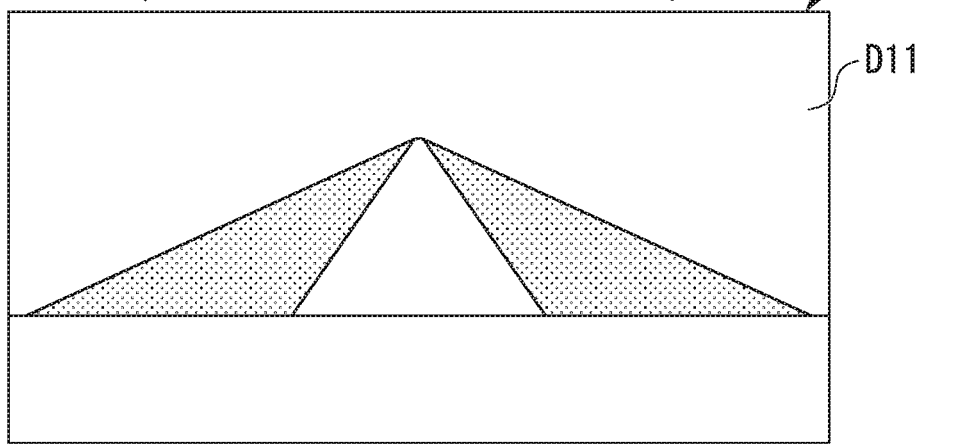
FIG. 7 is a diagram showing examples of display screens of the first display device transitioning in accordance with touch and an operation of an operator with respect to the steering switches of the vehicle display system according to the embodiment of the present invention.
Figure 7:
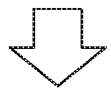
Figure 7:
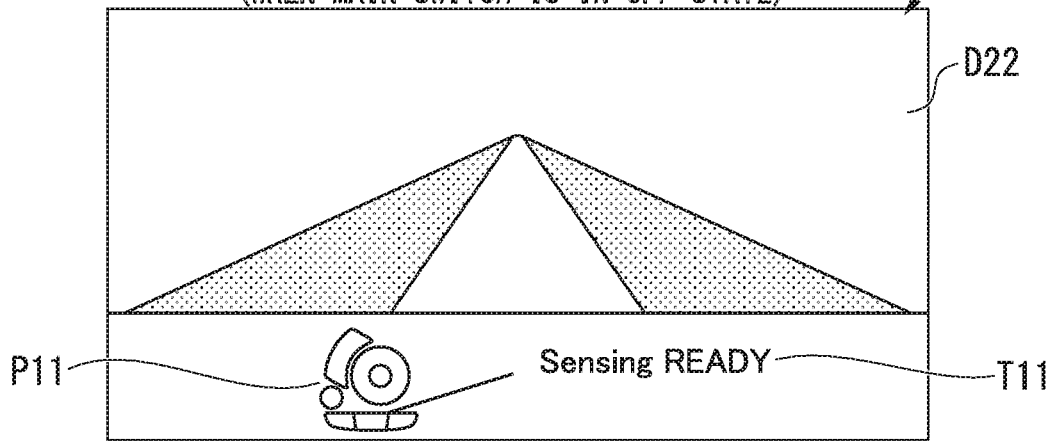
Figure 7:
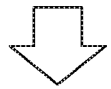
Figure 7:
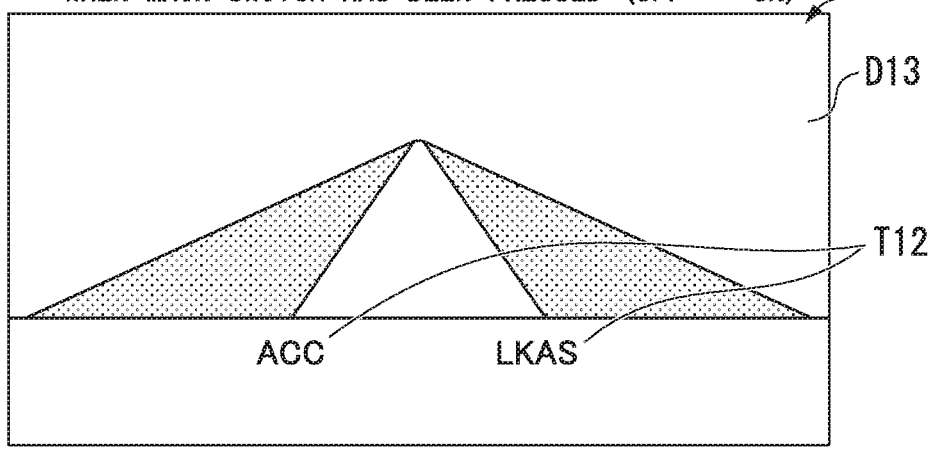

When, for example, the first key (RES switch) 51*a* of the directional key 51 included in the second steering switch 11B is touched by the operator in the off state of the travel support operation, the HMI control device 33 changes information to be displayed on the first display device 21 as illustrated in FIG. 7.

First, when the travel support operation is in the off state because the third push button (the MAIN switch) 54 is off and the operator has not touched the first key (RES switch) 51*a*, for example, the HMI control device 33 displays the first screen D11 on the first display device 21.

Next, when a detection signal is output from the first key (RES switch) 51*a* in response to the operator touching the first key (RES switch) 51*a*, the HMI control device 33 displays a fourth screen D22 on the first display device 21. The fourth screen D22 shows information regarding an operation necessary for permitting execution of a function associated with an operation of the first key (RES switch) 51*a*, for example (i.e., increasing of a set speed or return to a normal speed in cruise control). The fourth screen D22 includes, for example, the first text data T11 and first image data P11 as information prompting switching from the off state to the on-state of the travel support operation, which is necessary for increasing a speed to a set speed or returning to a normal speed in cruise control. The first image data P11 is image data indicating, for example, disposition of the third push button (the MAIN switch) 54 in the second steering switch 11B, which needs to be operated to switch the travel support operation from the off state to the on-state.

Next, when an operation signal is output from the third push button (the MAIN switch) 54 in response to the operator operating the third push button (the MAIN switch) 54, the HMI control device 33 displays the third screen D13 indicating that, for example, the travel support operation is in the on-state on the first display device 21. On the other hand, when the output of the detection signal from the first key (the RES switch) 51*a* stops in response to the operator releasing their finger from the first key (the RES switch) 51*a*, the HMI control device 33 displays the first screen D11 on the first display device 21.

When a detection signal is output from the steering switch 11 in a state in which execution of a function associated with an operation of the steering switch 11 is permitted, the HMI control device 33 displays information necessary for the execution of the function, for example, setting information or the like on the first display device 21.

Figure 8:
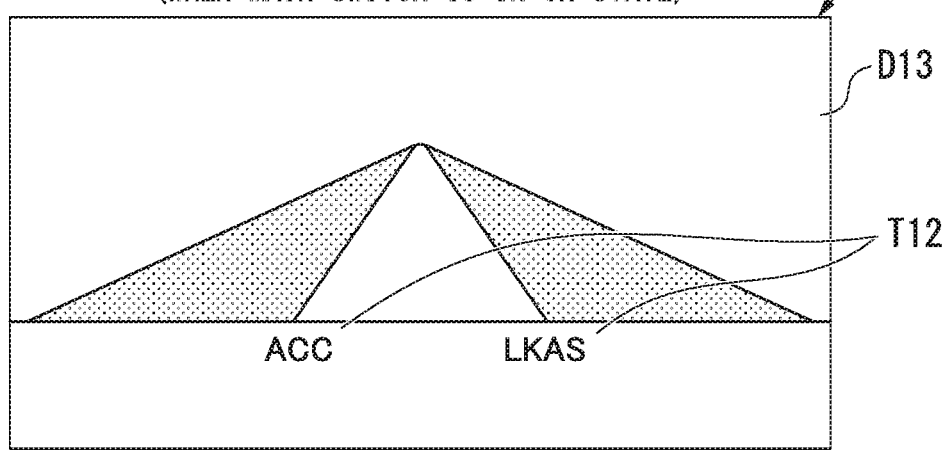
FIG. 8 is a diagram showing examples of display screens of the first display device transitioning in accordance with touch and an operation of an operator with respect to the steering switches of the vehicle display system according to the embodiment of the present invention.
Figure 8:
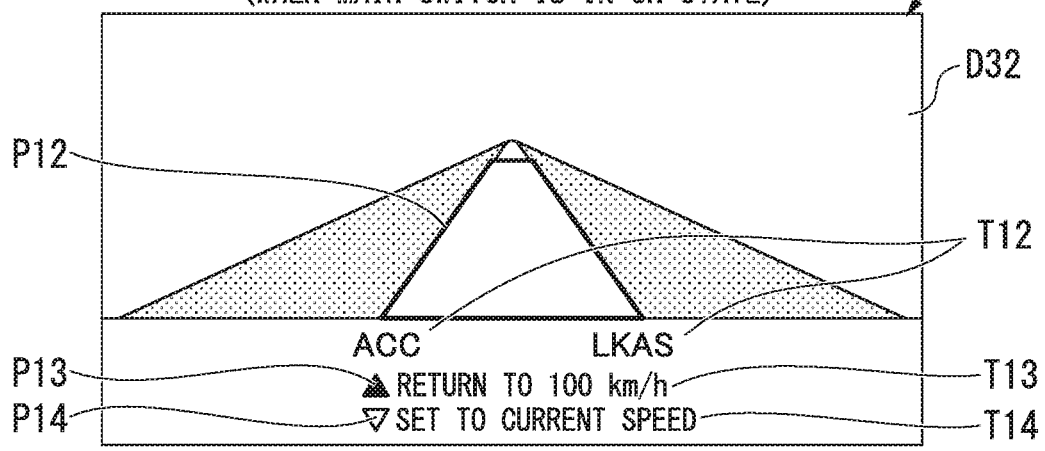
Figure 8:
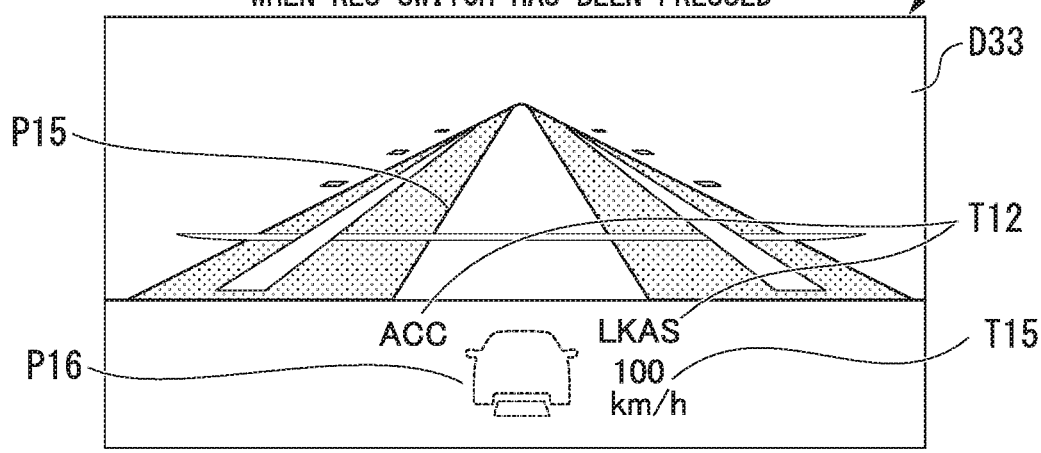

When, for example, the first key (the RES switch) 51*a* of the directional key 51 included in the second steering switch 11B is touched and operated by the operator in the on-state of the travel support operation, the HMI control device 33 changes information to be displayed on the first display device 21 as illustrated in FIG. 8.

First, when the travel support operation is in the on-state since the third push button (the MAIN switch) 54 is in the on-state and the operator has not touched the first key (the RES switch) 51*a*, for example, the HMI control device 33 displays, for example, the third screen D13 indicating that the travel support operation is in the on-state on the first display device 21.

Next, when a detection signal is output from the first key (the RES switch) 51*a* in response to the operator touching the first key (the RES switch) 51*a*, the HMI control device 33 displays a fifth screen D32 on the first display device 21. The fifth screen D32 includes, for example, information necessary for execution of a function associated with the operation of the first key (the RES switch) 51*a* (i.e., increasing of a speed to a set speed or return to a normal speed in cruise control). The fifth screen D32 includes, for example, second to fourth text data T12, T13, and T14 and second to fourth image data P12, P13, and P14 as setting information necessary for executing an increase of a speed to a set speed or return to a normal speed in cruise control. The second image data P12 is image data indicating, for example, that a set speed of cruise control can be adjusted. The third text data T13 is text data indicating, for example, return to a set speed of cruise control before cancellation (e.g., "return to 100 km/h"). The third image data P13 is image data indicating, for example, whether return to a set speed of cruise control before cancellation has been selected.

The fourth text data T14 is text data indicating that, for example, a current speed is set as a set speed of cruise control ("set to current speed"). The fourth image data P14 is image data indicating, for example, whether setting of a current speed as a set speed of cruise control to has been selected.

Next, when an operation signal is output from the first key (RES switch) 51*a* in response to the operator operating the first key (the RES switch) 51*a*, the HMI control device 33 displays a sixth screen D33 on the first display device 21. The sixth screen D33 shows information regarding execution of a function associated with an operation of the first key (the RES switch) 51*a*, i.e., information regarding increasing of or return to a set speed of cruise control. The sixth screen D33 includes second and fifth text data T12 and T15 and fifth and sixth image data P15 and P16 as information indicating that, for example, cruise control is being executed to return to the set speed. The fifth text data T15 is text data indicating, for example, the set speed of cruise control (e.g., "100 km/h"). The fifth and sixth image data P15 and P16 are image data indicating, for example, presence or absence of a preceding vehicle that needs to be considered in cruise control. On the other hand, when the output of the detection signal from the first key (the RES switch) 51*a* stops in response to the operator releasing their finger from the first key (the RES switch) 51*a*, the HMI control device 33 displays the third screen D13 on the first display device 21.

According to the vehicle display system 10 of the present embodiment, when an operator touches the steering switch 11, information regarding a function associated with the switch operation is displayed as described above, the operator can accurately ascertain the function to be executed in accordance with the switch operation before the execution. Accordingly, even when the operator is inexperienced at switch operations, for example, he or she can perform a switch operation with conviction after confirming a function associated with the switch operation, and thus usability of the steering switch 11 can be improved. Furthermore, since information regarding the function associated with the switch operation as well as information regarding a current state of the function is displayed, a change in an operation state caused by execution of the function associated with the switch operation can be clearly ascertained.

Moreover, when an operator touches the steering switch 11 in a state in which execution of a function associated with a switch operation is not permitted, information regarding an operation necessary for permitting the execution of the function associated with the switch operation is displayed, and thus proficiency in properly operating the steering switch 11 can be accurately improved.

A first modified example of the above-described embodiment will be described below.

In the above-described embodiment, when a detection signal is output from the steering switch 11, the HMI control device 33 may perform different types of control on the first display unit 21a and the second display unit 21b.

When a detection signal is output from the steering switch 11, the HMI control device 33 displays more detailed information than information on the first display unit 21a out of information regarding a function associated with an operation of the steering switch 11, for example, setting information, on the second display unit 21b. Note that the detailed information to be displayed on the second display unit 21b may be set such that the information can be called out, for example, in accordance with a plurality of operations performed by an operator with the fifth to the seventh push buttons 56, 57, and 58, the ninth push button (the MENU switch) 59, and the like of the first steering switch 11A.

Figure 9:
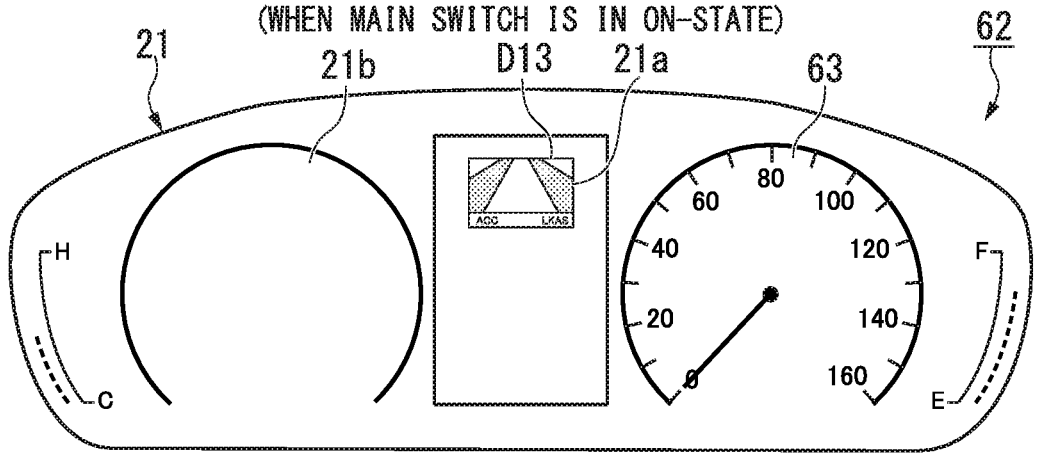
FIG. 9 is a diagram showing examples of display screens of a first display device transitioning in accordance with touch and an operation of an operator with respect to steering switches of a vehicle display system according to a first modified example of the embodiment of the present invention.
Figure 9:
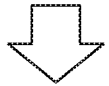
Figure 9:
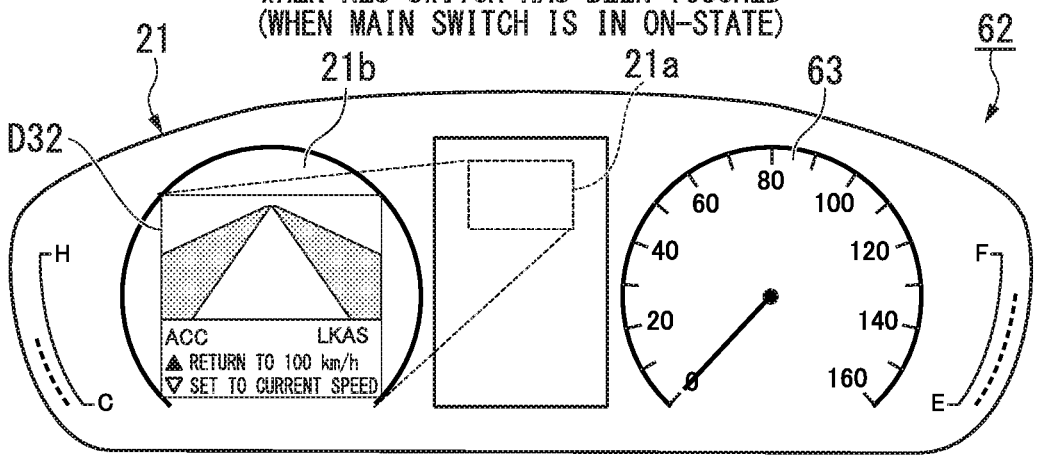
Figure 9:
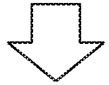
Figure 9:
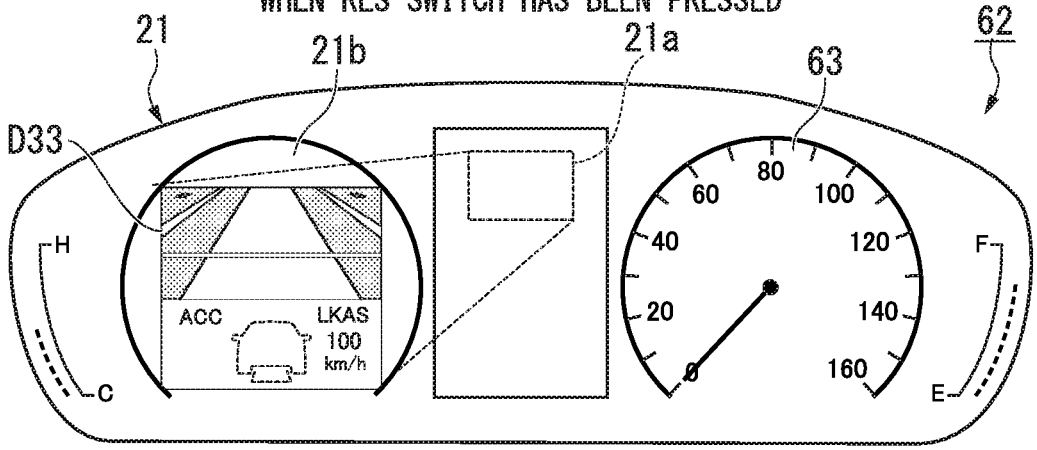

When an operator touches and operates the first key (the RES switch) 51a of the directional key 51 included in the second steering switch 11B in the on-state of the travel support operation, for example, the HMI control device 33 changes information to be displayed on the first display device 21 as illustrated in FIG. 9.

First, when the travel support operation is the on-state since the third push button (the MAIN switch) 54 is in the on-state but the operator has not touched the first key (the RES switch) 51a, for example, the HMI control device 33 displays the third screen D13 indicating that the travel support operation is in the on-state, for example, on the first display unit 21a of the first display device 21.

Next, when a detection signal is output from the first key (the RES switch) 51a in response to the operator touching the first key (the RES switch) 51a in a state in which the fifth screen D32 for showing setting information is not displayed on the first display device 21, for example, the HMI control device 33 cancels display of the third screen D13 in the first display unit 21a and displays the fifth screen D32 on the second display unit 21b.

Next, when an operation signal is output from the first key (the RES switch) 51a in response to the operator operating the first key (the RES switch) 51a, the HMI control device 33 displays the sixth screen D33 on the second display unit 21b. On the other hand, when the output of the detection signal from the first key (the RES switch) 51a stops in response to the operator releasing their finger from the first key (the RES switch) 51a, the HMI control device 33 cancels the display of the fifth screen D32 in the second display unit 21b and displays the third screen D13 on the first display unit 21a.

According to the above-described first modified example, when an operator touches the steering switch 11, setting information of a function associated with the switch operation is displayed, and thus usability of the steering switch 11 can be improved without requiring a special operation or a cumbersome operation for displaying the setting information.

A second modified example of the above-described embodiment will be described below.

In the above-described embodiment, when a detection signal or an operation signal is output from the steering switch 11 in a state in which execution of a function associated with the operation of the steering switch 11 is not permitted, the HMI control device 33 may display information regarding the use method of the steering switch 11 on the first display device 21. The HMI control device 33 may display information regarding an operation necessary for accessing more detailed information than information on the first display device 21 out of the information regarding the use method of the steering switch 11 on the first display device 21. The HMI control device 33 may display more detailed information than information on the first display device 21 on the second display device 23.

Figure 10:
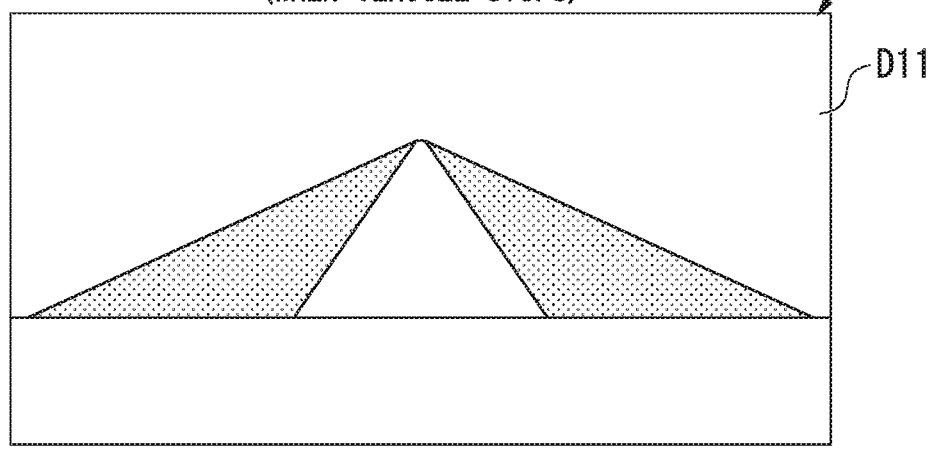
FIG. 10 is a diagram showing examples of a display screen of a first display device and a display screen of a second display device transitioning in accordance with touch and an operation of an operator with respect to steering switches of a vehicle display system according to a second modified example of the embodiment of the present invention.
Figure 10:
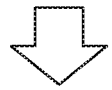
Figure 10:
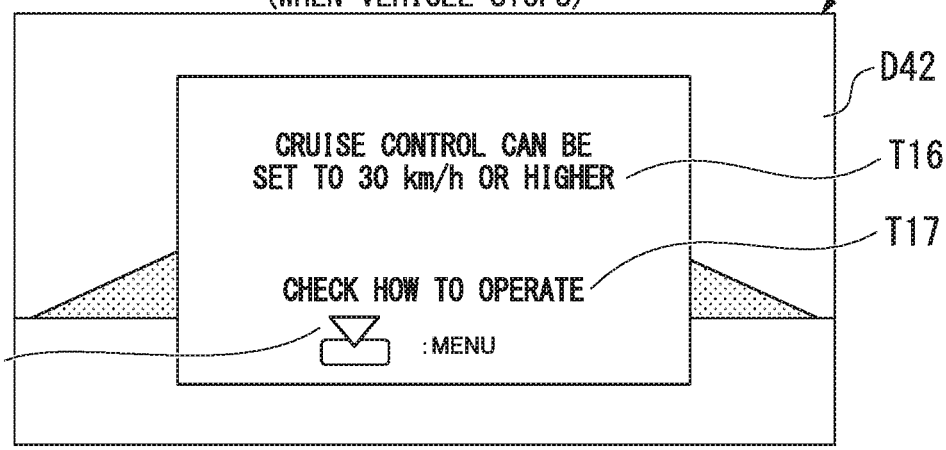
Figure 10:
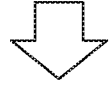
Figure 10:
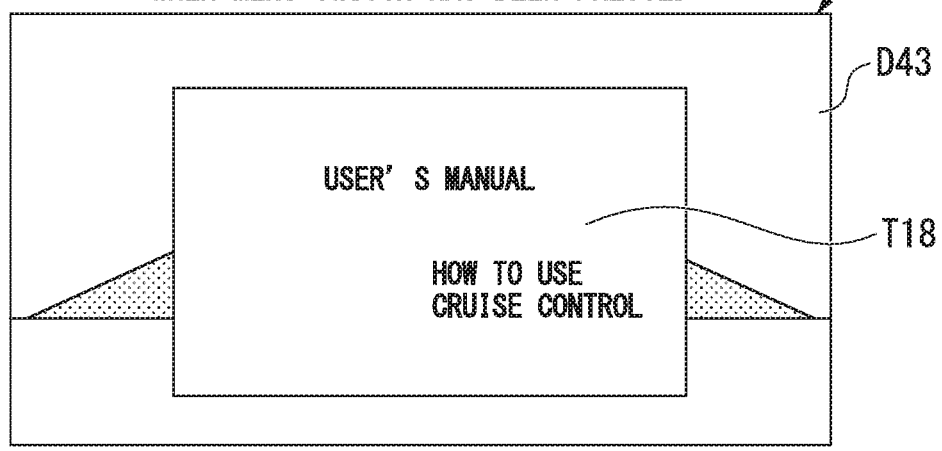

When an operator touches or operates the first key (the RES switch) 51a of the directional key 51 included in the second steering switch 11B in a stop state of the vehicle 1 in which execution of the travel support operation is not permitted, for example, the HMI control device 33 changes information to be displayed on the first display device 21 and the second display device 23 as illustrated in FIG. 10.

First, when the operator has not touched the first key (the RES switch) 51a in the state in which the execution of the travel support operation is not permitted, the HMI control device 33 displays the first screen D11 on the first display device 21.

Next, when a detection signal is output from the first key (the RES switch) 51a in response to the operator touching the first key (the RES switch) 51a, the HMI control device 33 displays a seventh screen D42 on the first display device 21. The seventh screen D42 includes sixth text data T16 as information regarding a use method of the first key (the RES switch) 51a. The sixth text data T16 is text data indicating that, for example, execution of cruise control is permitted at a predetermined speed or higher (e.g., "cruise control can be set to 30 km/h or higher"). The seventh screen D42 includes seventh text data T17 and seventh image data P17 as information regarding an operation necessary for accessing detailed information of the information regarding the use method of the first key (the RES switch) 51a. The seventh text data T17 is text data prompting, for example, access to the detailed information of the information regarding the use method of the first key (the RES switch) 51a (e.g., "check how to operate"). The seventh image data P17 is image data indicating, for example, a switch operation necessary for accessing the detailed information of the information regarding the use method of the first key (the RES switch) 51a.

Next, when the ninth push button (the MENU switch) 59 included in the first steering switch 11A is operated to access the detailed information of the information regarding the use method of the first key (the RES switch) 51a, for example, the HMI control device 33 displays an eighth screen D43 on the second display device 23. The eighth screen D43 includes eighth text data T18 as the detailed information of the information regarding the use method of the first key (the RES switch) 51a. The eighth text data T18 is, for example, data of the detailed information regarding the use method of the first key (the RES switch) 51a included in data of user's manual of the vehicle 1 stored in the second display device 23. On the other hand, when the output of the detection signal from the first key (the RES switch) 51a stops in response to the operator releasing their finger from the first key (the RES switch) 51a, the HMI control device 33 cancels display of the fifth screen D32 on the second display unit 21b and displays the third screen D13 on the first display unit 21a.

According to the above-described second modified example, when an operator touches the steering switch 11 in a state in which execution of a function associated with the switch operation is not permitted, information regarding the use method of the steering switch 11 is displayed, and therefore proficiency in properly operating the steering switch 11 can be improved and usability of the steering switch 11 can also be improved. Furthermore, since the information regarding the operation necessary for accessing the detailed information of information regarding the use method of the steering switch 11 is displayed, details of the use method of the steering switch 11 can be easily ascertained.

In the above-described embodiment, the vehicle display system 10 may include another operation switch instead of the steering switch 11.

Although the vehicle display system 10 is designed to include the first display device 21 and the second display device 23 disposed on the instrument panel 61 in the above-described embodiment, the invention is not limited thereto.

The vehicle display system 10 may include another display device instead of the first display device 21 and the second display device 23. The other display device may be, for example, a head-up display (HUD) device, an in-vehicle display device, or the like. An HUD device projects and displays a transparent image on part of windshield glass in front of the driver's seat, for example, or displays a virtual image above the instrument panel 61 in front of the driver's seat. An in-vehicle display device is configured by, for example, a liquid crystal display, an organic EL display, or the like disposed at a higher position than the steering wheel 41, or the like.

It should be understood that the above-described embodiments are examples the invention and are not to be considered as limiting. The embodiments can be implemented in other various modes, and diverse omissions, substitutions, modifications can be added thereto without departing from the spirit of the invention. The embodiments and modifications fall within not only the scope and the spirit of the invention but also the appended claims and a scope equivalent thereto.

What is claimed is:

1. A vehicle display system comprising:
    an operation switch configured to be provided in a vehicle and to distinguish and detect a non-operative touch and an operation with respect to the operation switch by an operator;
    a display device configured to be provided at a position at which the operator can visually recognize the display device; and
    a control device configured to display, on the display device, information regarding a function to be executed when an operation with respect to the operation switch is detected based on the non-operative touch with respect to the operation switch being detected,
    wherein the operation switch includes:
        a first switch configured to execute a travel support operation of the vehicle; and
        a second switch configured to perform a control of the travel support operation,
    wherein,
    when a non-operative touch with respect to the second switch is detected in a state in which an execution of the travel support operation is not permitted, the control device displays information regarding a vehicle traveling state necessary for permitting the execution of the travel support operation on the display device, and
    wherein,
        when a non-operative touch with respect to the second switch is detected in a state in which an execution of the travel support operation is permitted but is not executed, the control device displays information regarding an operation with respect to the operation switch necessary for executing the travel support operation on the display device.

2. The vehicle display system according to claim 1, wherein the operation is a pressing operation with respect to the operation switch.

3. The vehicle display system according to claim 1, wherein, when the non-operative touch with respect to the operation switch is detected, the control device displays, on the display device, information regarding a current state of the function in addition to the information regarding the function.

4. The vehicle display system according to claim 1, wherein, when the information regarding the function is setting information of the function and a non-operative touch with respect to the operation switch for operating the setting information is detected in a state in which the setting information is not displayed on the display device, the control device displays the setting information on the display device.

5. The vehicle display system according to claim 1, wherein, when a non-operative touch or an operation with respect to the operation switch is detected in a state in which an execution of the function is not permitted, the control device displays information regarding a use method of the operation switch on the display device.

6. The vehicle display system according to claim 5, wherein, when the non-operative touch or the operation with respect to the operation switch is detected in the state in which the execution of the function is not permitted, the control device displays information regarding an operation necessary for accessing detailed information of the information regarding the use method of the operation switch on the display device.

* * * * *